July 28, 1936.　　　　E. C. HORTON　　　　2,049,009
MOTOR VEHICLE CONSTRUCTION
Filed Aug. 24, 1932　　　　2 Sheets-Sheet 1
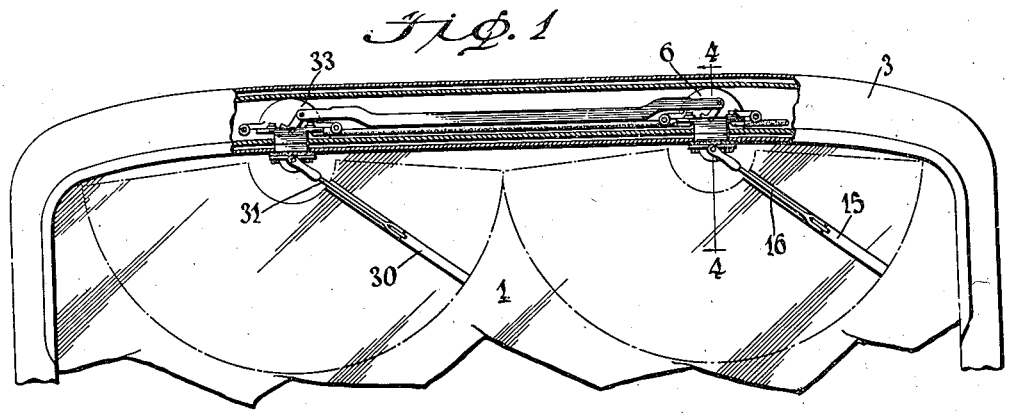
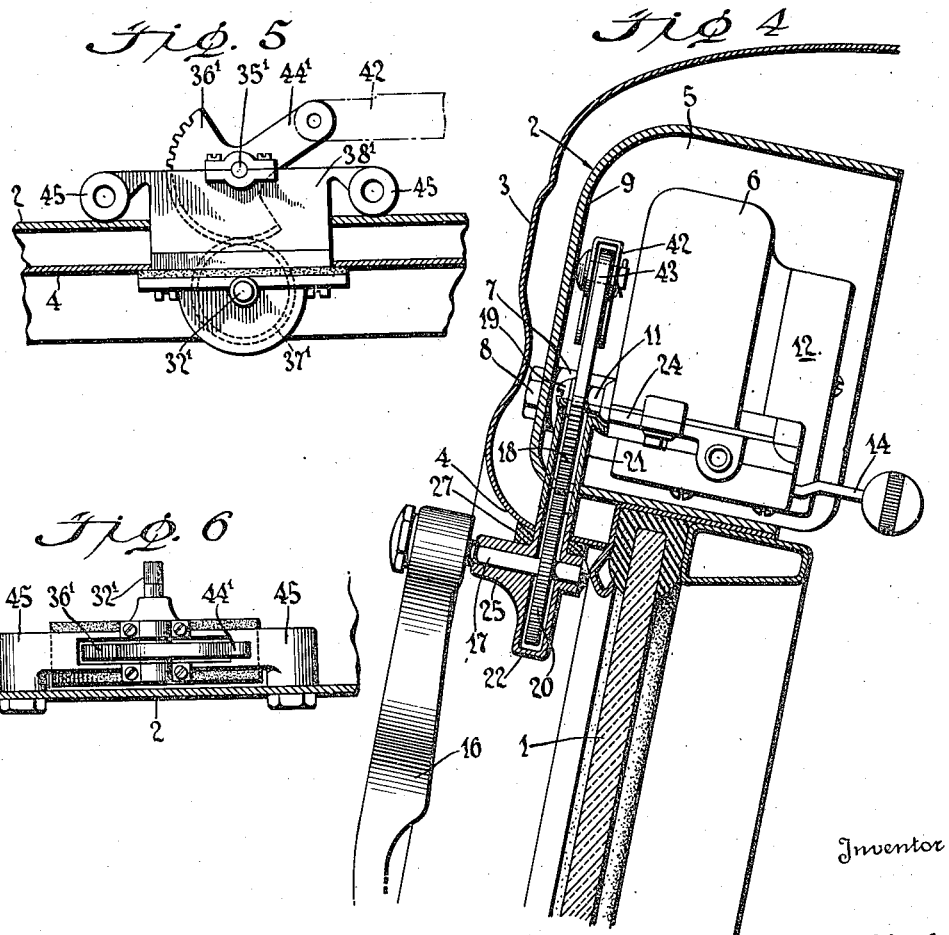
Inventor
Erwin C. Horton
By Beau & Brooks, Attorneys July 28, 1936.                E. C. HORTON                2,049,009
                       MOTOR VEHICLE CONSTRUCTION
                         Filed Aug. 24, 1932          2 Sheets-Sheet 2
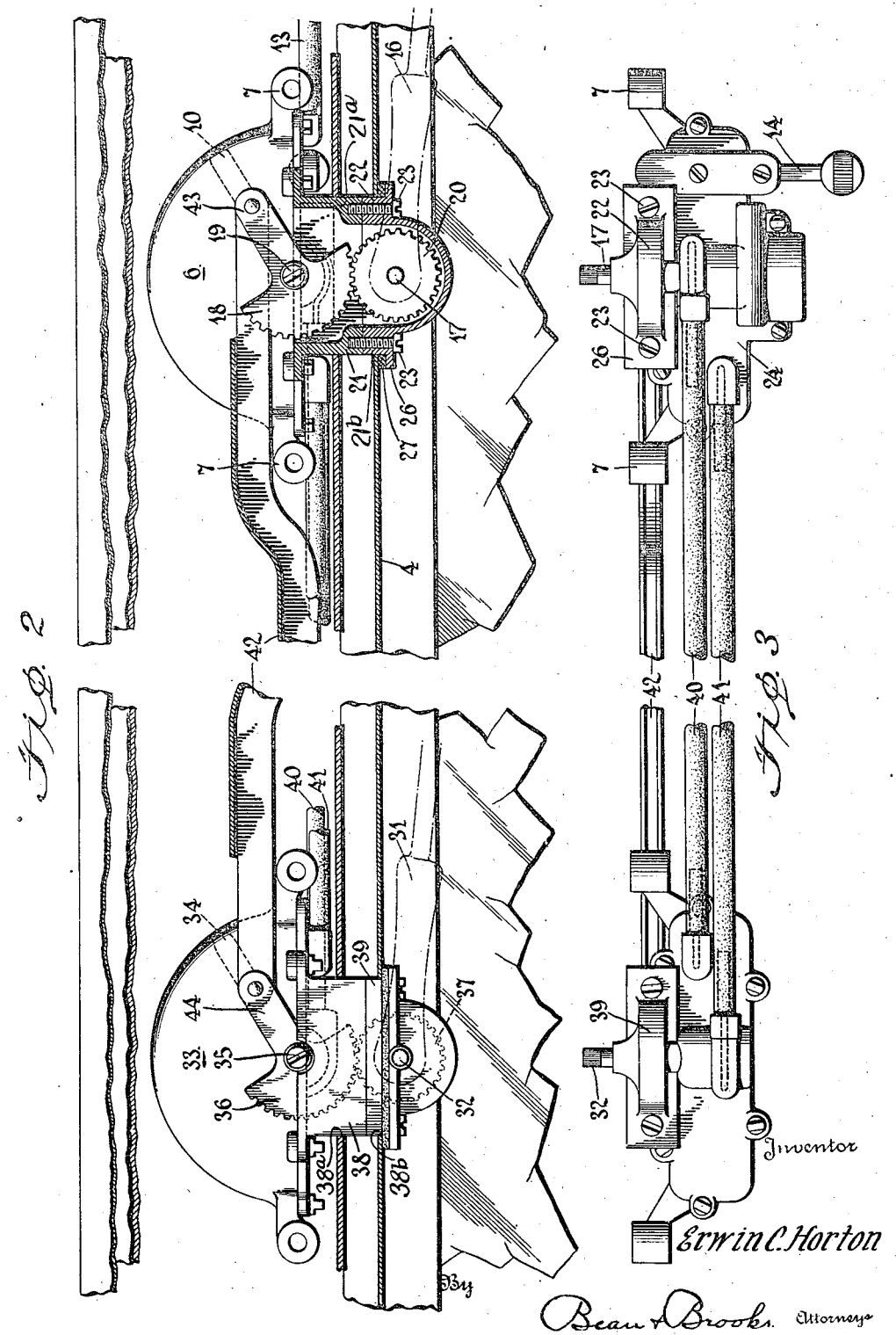

Patented July 28, 1936

2,049,009

UNITED STATES PATENT OFFICE 2,049,009

MOTOR VEHICLE CONSTRUCTION

Erwin C. Horton, Hamburg, N. Y., assignor to Trico Products Corporation, Buffalo, N. Y.

Application August 24, 1932, Serial No. 630,305

11 Claims. (Cl. 15—255)

This invention relates to a motor vehicle construction and more particularly to the incorporation of the windshield cleaner mechanism within that portion of the body which frames the windshield.

Heretofore, the windshield cleaner has been housed beneath the windshield visor, but the trend in the modern automobile is away from the use of the visor and toward the stream line body design.

An object of the present invention is to provide a vehicle body construction embodying the cleaner mechanism for the windshield whereby the mechanism is thoroughly protected and concealed to view, and further to provide a cleaner mechanism by which a larger area of the windshield may be cleaned to enable greater vision therethrough.

In the drawings:

Fig. 1 is a fragmentary front elevation of the upper part of a motor vehicle, portions of the header construction being broken away to more clearly disclose the windshield cleaner mechanism housed therein.

Fig. 2 is an enlarged fragmentary view through the upper part of a motor vehicle, showing more clearly the windshield cleaner mechanism disposed therein.

Fig. 3 is a fragmentary bottom plan view of the mechanism removed from the vehicle construction.

Fig. 4 is a sectional view about on line 4—4 of Fig. 1.

Fig. 5 is a detail showing of the modified auxiliary wiper mounting.

Fig. 6 is a plan view thereof.

Referring more particularly to the drawings, the numeral 1 designates the windshield of a motor vehicle above which is disposed the framing header bar construction herein depicted as embodying a transverse channeled frame member 2 and a roof trim member 3 which extends down over the front of the channel member so as to afford a neat finish and trim for the motor vehicle, said trim member being extended beneath the channel member and inwardly against the windshield, as indicated at 4.

The channel member 2 is disposed on its side with its channel open rearwardly and thereby providing a readily accessible chamber 5 for housing the windshield cleaner motor 6. This motor is provided with suitable means for mounting it within the chamber, such as the ears 7 through which bolts 8 pass into the front wall 9 of the chamber.

The windshield cleaner motor is preferably of the fluid pressure type and, according to the present showing, is provided with a segmental circular chamber in which oscillates a vane-like piston 10 that is fixed to a shaft 11, operating pressure being applied to the opposite sides of the piston alternately by automatic valve mechanism housed within a valve case 12 and not particularly described herein. If subatmospheric pressure is used to operate the motor, the suction is supplied by a conduit 13 which is opened and closed at will by a shut-off valve generally indicated at 14. This general type of windshield cleaner motor is illustrated with greater detail in Patent No. 1,562,112. The chamber 5 at the header may be closed by a finishing panel not shown.

The wiper element or blade 15 is carried back and forth through an arcuate path by an arm 16 fixed to and oscillated by an actuating shaft 17. This shaft is journalled preferably at the underside of the header construction so that the axis of oscillation for the wiper arm 16 will be approximately at the upper edge of the transparent area of the windshield, thereby enabling a greater sweep for the wiper blade 15, even through an arc approximately 180° if desired. However, in practice a shorter stroke is preferred so as to provide ample space for parking the wiper outside of the running range thereof.

The wiper actuating shaft 17 is connected to the motor shaft 11 by a transmission which extends the drive downwardly from the motor through a passageway in the header construction. In the particular form illustrated this transmission comprises a drive gear 18 fixed on the motor shaft 11, as by screw 19, and a gear 20 fixed on the wiper shaft 17 and meshing with the former gear, these two gears extending through openings 21a and 21b (Fig. 2) provided in the bottom wall of chamber 5 and the extended portion 4 of the trim 3. These gears are enclosed within a housing which for convenience in assembling and mounting is herein illustrated as comprising a plurality of sections, the upper section 21 being carried by the motor 6 while the lower section 22 is secured to the section 21 as by fasteners 23.

The upper section may be formed as a part of the cover casting 24 of the motor 6. The lower section is provided with bearings 25 in which is journalled the wiper actuating shaft 17. In mounting the cleaner the lower section is inserted upwardly through the header and then attached to the upper section 21. An outwardly extending flange 26 overlies the adjacent portion of the trim part 4 and serves more or less to interlock with the header, the joint being weather-proofed and cushioned by a gasket member 27, as shown clearly in Figs. 2 and 4. The overlapping flange 26 serves as an additional brace or steadying means for the motor by reason of its engagement against the trim or header construction.

From the foregoing it is observed that the windshield cleaner is housed and protected from the weather elements and is concealed within the header while at the same time the wiper shaft has its axis disposed at the lower edge or underside of the header, being suspended from the motor through the header construction and still retaining its unitary make-up, and at the same time entering into the header construction by reason of the more or less interlocking relation between the several parts thereof. The construction provides a cleaner embodiment in the motor car construction in which power is taken from a concealed source and transmitted through the body construction to an exteriorly mounted wiper shaft, the cleaner mechanism being interlocked into the body or header construction.

By reason of the disposition of the automatically operated wiper shaft as herein provided, the wiper is permitted to have a large sweep and to be parked flatly against the header; the power is transmitted from a concealed source to a wiper shaft which is dropped to a point in proximity to the windshield transparency.

In the particular embodiment shown in Figs. 1 through 4 there is an auxiliary or secondary motor for driving an auxiliary wiper 30 which is carried by the wiper arm 31 from its actuating shaft 32. The secondary motor 33 may likewise be of the vane piston type, having the vane piston 34 fixed to its shaft 35 to which also is connected the drive gear 36. This gear meshes with the driven gear 37 on the wiper actuating shaft 32 and is encased within the gear housing comprising the sections 38 and 39 extending through openings 38a and 38b in the header structure. These sections being substantially identical with the housing sections 21 and 22.

The secondary motor 33 may be dependent upon the motor 6, or upon its valve action, for having the operating pressures applied to the piston 34 so as to drive the latter in synchronism with the piston 10. To this end a conduit or passage 40 extends from one end of the piston chamber of the secondary motor to the corresponding end of the piston chamber of the main motor 6. A like conduit or passage 41 establishes fluid communication between the opposite end of the piston chamber of the secondary motor and the corresponding end of the piston chamber of the primary motor. Consequently, if the valve mechanism 12 establishes communication between the suction conduit 13 and the right hand end of the piston chamber of motor 6, as viewed in Fig. 2, the conduit 40 will likewise establish communication with the right hand end of the secondary piston chamber, the opposite ends of these two chambers being opened to the atmosphere, and when the valve mechanism shifts the pressure application, the conduits 40 and 41 will likewise effect a shift in the applications of the suction and atmospheric pressure in the chamber of the secondary motor.

In order to insure harmony in the movements of the wiper arms 16 and 31, in the event that one motor is freer in its movement than the companion motor and tends to move its wiper faster than the companion wiper, there is provided a mechanical connection between the two arms to distribute and equalize the power applications in such a manner as to move both wipers in synchronism and at the same speed of movement. This mechanical connection is herein illustrated as a link 42 which is also housed within the body or header construction to avoid exposing the link by a direct connection between the wiper arms. One end of the link is connected to an arm 43 extending from the main motor shaft 11 and at its opposite end is connected to an arm 44 fixed on the shaft 35 of the secondary motor. In the particular embodiment these arms are formed as parts of the gears 18 and 36, the latter being preferably of segmental form. The intermediate portion of the connecting link may be dropped to clear any adjacent body structure.

This companion or secondary wiper serves to increase the efficiency of the windshield cleaner by adding to the surface area cleaned. The dual wipers are operated by twin motors, the entire drive mechanism of which being contained and incorporated within the body or header construction, concealed and protected from the weather while at the same time disposing the wiper shafts in a suspended manner so as to impart an increased sweep as well as enable the parking of the wipers without the driving field of vision.

In Figs. 5 and 6 there is depicted a modified auxiliary wiper drive of a simple form, modified by the elimination of the secondary motor and its fluid connection with the main motor. In this modified showing the secondary drive shaft 35' supports the drive gear 36' and the arm 44', the latter being connected by the connecting link 42 to the primary motor in a manner similar to that just described. The gear 36' meshes with and drives the gear 37' and its wiper actuating shaft 32'. This enables the mounting of the auxiliary drive within the header construction and at the same time enables the projection of the drive to a point beneath the header. The gear housing 38' may be provided with attaching ears 45 by which it may be mounted on the channeled member 2.

As illustrated in both modifications, the drive gear is of larger pitch radius than the driven gear, i. e., in the device of Figs. 1 to 4, the gear 36 is of larger radius than the driven gear 37, and the device of Figs. 5 and 6, gear 36' is of larger radius than gear 37'. The reason for this relationship is that the arc of movement of a wiper arm preferably approaches 180°, being in the neighborhood of 160° to 170°, whereas the arc of movement of a member which is rocked by a reciprocating link (such as member 36', 44' which is rocked about axle 35' by reciprocating link 42) is preferably considerably less than 180°, in the neighborhood of 135°. Movement through a greater angle will place undue stresses on the mechanism and will endanger the rock member reaching a dead-center position relative to the reciprocating link, which would lock the device.

Thus, in the event the rock arm 44' were connected directly to the wiper shaft 32', the degree of wiper movement would be restricted by practical considerations to a degree materially less than 180° or to about 135°. However, by providing an additional shaft, 35', and by making drive gear 36' on shaft 35' of greater pitch radius than gear 37' which is fixed to wiper shaft 32', the wiper arm has a full arcuate movement closely approaching 180° while the movement of rock arm 44' is maintained within the necessarily limited degree.

What is claimed is:

1. A motor vehicle having a chambered header construction above a windshield, a motor supported by, and housed within the chamber of the header construction and having a drive shaft, a gear fixed on the shaft, a housing carried by the motor and enclosing the gear, said header construction having an opening in its lower side through which the housing extends, a wiper actuating shaft disposed substantially at a normal to the windshield and journalled in the housing beneath the header construction and without the chamber thereof, said housing serving as a support for the wiper actuating shaft, a gear fixed on the wiper shaft within the housing and meshing with the first gear, and a wiper connected to the shaft for being oscillated thereby over the windshield.

2. A motor vehicle construction having a chambered header above a windshield with an opening in the bottom of the chamber to the exterior side of the windshield, a drive mechanism housed within the header chamber, a wiper actuating shaft supported exteriorly of the chamber and adjacent the windshield and having its axis substantially at a normal to the windshield, a wiper operable by the shaft, and gearing extending through the chamber opening and connecting said drive mechanism with the wiper actuating shaft.

3. A motor vehicle construction having a chambered header above the windshield with an opening in the bottom of the chamber to the exterior side of the windshield, a drive mechanism housed within the header chamber, a wiper actuating shaft supported exteriorly of the header and adjacent the windshield and having its axis substantially at a normal to the windshield, a wiper operable by the shaft, gearing extending through the header opening and connecting said drive mechanism with the wiper actuating shaft, a housing supported by the header in the header opening and constituting an enclosure for the gearing, said wiper actuating shaft being journalled in and supported by the housing in advance of the windshield and beneath the header.

4. A motor vehicle construction having a chambered header above the windshield with an opening through the bottom of the chamber to the exterior side of the windshield, a drive shaft journalled within the header chamber, a wiper actuating shaft disposed exteriorly of the chamber and adjacent the windshield, gearing extending through the header opening and connecting said drive shaft to the wiper shaft, a housing comprising a fixed section within the chamber and a removable lower section detachably connected to the fixed section through the chamber opening, the wiper actuating shaft being journalled in the lower section, said gearing including a gear on the wiper shaft and a gear operatively connected to the drive shaft and journalled in the fixed section whereby the gearing is automatically rendered operative and inoperative upon placement and removal of the lower section, said gears being intermeshed.

5. In a motor vehicle construction having a chambered structure above the windshield with spaced openings therethrough to the exterior in advance of the windshield, a pair of drive means housed within the chamber of said structure adjacent the openings therein, means for operating the two drive means concurrently, mechanical means within the chamber and connecting the two drive means for insuring synchronous movement between the two drive means, a wiper actuating shaft for each drive means journalled below the structure in advance of the windshield and adjacent each opening in the header, and gearing extending through the header openings and operatively connecting the wiper actuating shafts to their respective drive means.

6. A motor vehicle construction having a windshield with an adjacent body member extending forwardly thereof and provided with an opening in front of the windshield, said body member being provided with a chamber accessible through the opening, windshield cleaner drive means disposed in the chamber and extending through the opening, a wiper actuating shaft operatively connected to said drive means, and a housing connected to the body member and extending through the opening and supporting the shaft substantially at a normal to the windshield, said housing having a removable outer section in which said shaft is journaled, said outer section having a weather sealing part overhanging the margin of the opening through said body member.

7. A motor vehicle construction having a windshield with an adjacent body member extending forwardly thereof and provided with an opening in front of the windshield, said body member being provided with a chamber accessible through the opening, windshield cleaner drive means disposed in the chamber and extending through the opening, a wiper actuating shaft operatively connected to said drive means, and a housing connected to the body member and extending through the opening and supporting the shaft substantially at a normal to the windshield, said housing having a removable outer section in which said shaft is journaled, and means interlocking the outer section of the housing with said body member against inward movement of the housing within the opening.

8. In a motor vehicle construction, a chambered header having windshield supporting portions, said header having spaced openings therethrough to the exterior in advance of the windshield supporting portions, a drive shaft disposed in the header chamber adjacent each header opening, means operatively connecting the drive shafts, a wiper actuating shaft for each drive shaft, housing means suspending the wiper actuating shafts from the header and extending through the openings in the header, gearing operatively connecting each drive shaft with its associated wiper actuating shaft through the adjacent header opening, and a wiper operable by each actuating shaft.

9. In a motor vehicle construction having a windshield, a chambered header overhanging the windshield, said header having openings therein, a pair of motors supported by the header, means for operating the motors concurrently, each motor carrying a shaft in the header chamber, a wiper actuating shaft for each motor and disposed in front of the windshield substantially at a normal thereto, means for supporting each actuating shaft, gearing extending through openings in the header and operatively connecting each motor shaft with its associated wiper actuating shaft, a wiper operable by each actuating shaft, arms fixed to the motor shafts, and means within the header chamber connecting the arms for synchronizing the movements of the two wipers.

10. In a motor vehicle construction having a windshield incorporated therein, a chambered header overhanging the windshield, said header having openings therein, a pair of motors each carrying a shaft extending into the chambered portion of the header, said header having means for supporting the motors, means for operating the motors concurrently, a wiper actuating shaft for each motor and disposed in front of the windshield substantially at a normal thereto, means for supporting each actuating shaft, gearing extending through openings in the header and operatively connecting each motor shaft with its associated wiper actuating shaft, a wiper operable by each actuating shaft, a connecting bar in the header chamber mechanically connected at its opposite ends to the motor shafts for synchronizing the movements thereof whereby uniform and timed back and forth movements are imparted to the wipers over the wipeable areas of the windshield.

11. In a motor vehicle construction having a windshield incorporated therein, a chambered header having openings therein, a pair of motors in the header chamber, means for operating the motors concurrently, a wiper actuating shaft for each motor, housing means connected to the header in contiguous relation to said openings and suspending the wiper actuating shafts from the header in front of and substantially at a normal to the windshield, gearing operatively connecting the motor through said openings with its associated wiper actuating shafts and said gearing being substantially enclosed in the housing means, and mechanical means within the header chamber and connecting the two motors to insure synchronized movement of the wipers.

ERWIN C. HORTON.